United States Patent
Cao et al.

(10) Patent No.: US 10,571,627 B2
(45) Date of Patent: Feb. 25, 2020

(54) OPTICAL FIBER, AND SYSTEM AND METHOD FOR MANUFACTURING OPTICAL FIBER

(71) Applicants: ZHONGTIAN TECHNOLOGY FIBER POTICS CO., LTD, Nantong (CN); ZHONGTIAN TECHNOLOGY ADVANCED MATERIALS CO., LTD., Nantong (CN); JIANGSU ZHONGTIAN TECHNOLOGY CO.,LTD., Nantong (CN)

(72) Inventors: Shan-Shan Cao, Nantong (CN); Zhi-Zhong Liu, Nantong (CN); Yi-Chun Shen, Nantong (CN); Xiao-Xing Zhu, Nantong (CN); Zhen Wang, Nantong (CN); Hai-Tao Zhang, Nantong (CN); Hai-Tao Xu, Nantong (CN); Ji-Gang Hu, Nantong (CN); Hai-Yan Su, Nantong (CN)

(73) Assignees: ZHONGTIAN TECHNOLOGY FIBER POTICS CO., LTD, Nantong (CN); ZHONGTIAN TECHNOLOGY ADVANCED MATERIALS CO., LTD., Nantong (CN); JIANGSU ZHONGTIAN TECHNOLOGY CO., LTD., Nantong (CN)

( * ) Notice: Subject to any disclaimer, the term of this patent is extended or adjusted under 35 U.S.C. 154(b) by 0 days.

(21) Appl. No.: 16/205,253

(22) Filed: Nov. 30, 2018

(65) Prior Publication Data

US 2019/0101693 A1    Apr. 4, 2019

Related U.S. Application Data

(63) Continuation-in-part of application No. PCT/CN2017/081168, filed on Apr. 20, 2017.

(30) Foreign Application Priority Data

Jun. 1, 2016 (CN) .......................... 2016 1 0376895

(51) Int. Cl.
G02B 6/02 (2006.01)
C03B 37/027 (2006.01)
(Continued)

(52) U.S. Cl.
CPC .......... *G02B 6/02019* (2013.01); *C03B 25/10* (2013.01); *C03B 37/027* (2013.01); (Continued)

(58) Field of Classification Search
CPC G02B 6/02019; G02B 6/036; G02B 6/02395; C03B 25/10; C03B 37/027; (Continued)

(56) References Cited

U.S. PATENT DOCUMENTS 7,565,820 B2* 7/2009 Foster ............... C03B 37/02718
                                                      65/384
9,891,379 B2* 2/2018 Bookbinder ....... G02B 6/02395

FOREIGN PATENT DOCUMENTS

CN          103454719 A     12/2013
CN          106125192 A     11/2016

* cited by examiner

*Primary Examiner* — Michael P Mooney
(74) *Attorney, Agent, or Firm* — ScienBiziP, P.C.

(57) ABSTRACT

An optical fiber comprises, from a center to a periphery, a fiber core of undoped silica; a cladding layer; and a coating of polyacrylate, wherein the fiber core has a radius of 5 to 7 μm and an ellipticity of less than 1.5%, the cladding layer with an ellipticity of less than 0.4% comprises inner, intermediate, and outer cladding layers, the inner cladding layer being doped with fluorine of 5 to 12 μm thickness, and refractive index difference to fiber core of −0.4 to −0.2%, the outer cladding layer being undoped quartz of 25 to 45 μm (Continued)

thickness, and the coating comprises an inner coating of 25 to 40 μm thickness, and an outer coating of 25 to 35 μm thickness and an ellipticity of less than 2%. The optical fiber has high durability and large effective transmission area, a method and system for preparing such optical fiber are also disclosed.

13 Claims, 7 Drawing Sheets (51) Int. Cl.
*G02B 6/036* (2006.01)
*C03C 25/12* (2006.01)
*C03B 37/029* (2006.01)
*C03B 25/10* (2006.01)
*C03C 25/1065* (2018.01)
*C03C 25/285* (2018.01)
*C03B 37/018* (2006.01)
*C03B 37/014* (2006.01)

(52) U.S. Cl.
CPC ...... *C03B 37/029* (2013.01); *C03B 37/02718* (2013.01); *C03B 37/02727* (2013.01); *C03C 25/1065* (2013.01); *C03C 25/12* (2013.01); *C03C 25/285* (2013.01); *G02B 6/02395* (2013.01); *G02B 6/036* (2013.01); *C03B 37/014* (2013.01); *C03B 37/018* (2013.01); *C03B 2201/12* (2013.01); *C03B 2203/23* (2013.01); *C03B 2205/42* (2013.01); *C03B 2205/56* (2013.01); *C03B 2205/81* (2013.01); *C03B 2205/92* (2013.01)

(58) Field of Classification Search
CPC ........ C03B 37/02718; C03B 37/02727; C03B 37/029; C03B 37/014; C03B 37/018; C03B 2201/12; C03B 2203/23; C03B 2205/42; C03C 25/1065; C03C 25/12; C03C 25/285; B29D 11/00663; B29D 11/00701
USPC .......... 385/123–128; 264/1.24, 1.25; 65/384, 65/385
See application file for complete search history.

OPTICAL FIBER, AND SYSTEM AND METHOD FOR MANUFACTURING OPTICAL FIBER

FIELD

The subject matter herein generally relates to manufacturing of optical fibers.

BACKGROUNDING

Deterioration of signal-to-noise ratio and nonlinear effects of optical fiber restrict communication distance. Reducing, the transmission losses of fiber and increasing the effective area of optical fiber are the main ways to overcome these two restrictive factors. Reducing the transmission losses of optical fiber improves the signal-to-noise ratio, while increasing the effective area reduces the nonlinear effects.

During manufacturing of optical fibers, after long usage of a fiber drawing furnace, the graphite in the fiber drawing furnace may accumulate a small amount of oxidation on a surface of the graphite which increases a surface roughness of the graphite. The fiber preform at high temperature generates a small amount of silica by sublimation which reacts with the surface of the graphite by forming hard particles of silicon carbide (SiC), and the particles float in the drawing furnace under the effect of the air flows in the drawing furnace. The existing fiber drawing furnace body contains, a gas disc on top of the furnace and an annealing tube on the bottom end. Inert gas is introduced in an upper portion of the fiber drawing furnace and, flows through the fiber drawing furnace into the annealing tube, thus the inert gas flows from up to down by mode of laminar flow. The main advantage of the laminar flow is that the air flows are flat and gentle, and will not cause flow disturbances in the fiber drawing furnace, nor will the SiC particles being deposited in the inner wall of the graphite. Thus, the likelihood of SiC particles contacting the optical fiber core may be reduced. A long drawing process causes SiC particles to accumulate on the inner wall of graphite, and under the influence of high temperature diffusion, the SiC particles may adversely affect a quality of the optical fiber core, such as a sudden change in the properties of the fiber.

Moreover, the attenuation coefficient of the fiber is limited by the preparation processes of the preform and also by an ideal temperature of the quartz glass. When the temperature of the quartz fiber is lowered from the softening temperature to the ideal temperature, the internal structure of the quartz glass is in an equilibrium state. When the quartz temperature is lower than the ideal temperature, the internal structure of the fiber is more strongly set and may more resistant to deformation. If internal stresses of the fiber are not fully released when the fibers reach the ideal temperature, the Rayleigh scattering caused by uneven densities of the fiber will significantly affect the attenuation coefficient of the fiber. The annealing process affects the internal stresses of the fiber. Uneven internal temperatures of the insulation annealing furnace may cause incomplete stress release in the fiber.

Existing UV curing furnaces generally uses an air extraction system to reduce the temperature in the UV curing furnace (and to prolong a life of the UV curing furnace) and to extract volatiles of surface coating material of the optical fiber to improve the processing quality of the optical fiber. Simultaneously, an exhaust system is used to remove harmful gases, so that the extracted volatiles do not pollute the surrounding environment and create hazards to health. A wind speed of the exhaust system should be not too fast or too slow, so that curing of the fiber is not affected. The wind speed of the exhaust system should be kept constant and stable.

The exhaust pipe is prone to blockages after long usages in the production processes, resulting in a decrease in wind speed. Therefore, the exhaust pipe must be manually monitored and adjusted during the shutdown to ensure the wind, speed remains constant and stable. The curing process can be affected by human factors for needing monitoring and adjusting manually. When a problem occurs during the curing or the coating processes of optical fiber production, the production may need to be forcibly terminated so the flow rate can be monitored or adjusted. During normal productions, the actual flow rate of the exhaust cannot be monitored or adjusted.

An optical fiber with low transmission losses and large effective area and a method of manufacturing the optical fiber and a system of manufacturing the optical fiber are disclosed herein.

BRIEF DESCRIPTION OF THE DRAWING

Implementations of the present technology will now be described, by way of embodiments, with reference to the attached figure.

DETAILED DESCRIPTION OF EMBODIMENTS

It will be appreciated that for simplicity and clarity of illustration, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts have been exaggerated to better illustrate details and features of the present disclosure. The description is not to be considered as limiting the scope of the embodiments described herein.

Several definitions that apply throughout this disclosure will now be presented. The term "comprising" means "including, but not necessarily limited to"; it specifically indicates open-ended inclusion or membership in a so-described combination, group, series, and the like. The term "coupled" is defined as connected, whether directly or indirectly through intervening components, and is not necessarily limited to physical connecting. The coupling can be such that the objects are permanently connected or releasably connected. The term "substantially" means essentially conforming to the particular dimension, shape, or other feature that the term modifies, but such that the component need not have that exact feature.

It should be noted that, when an element is considered to be "fixed to" another element, which can be either directly fixed on another element or indirectly fixed on another element with a centered element. When an element is considered to be "coupled with" another element, which can be either directly coupled with another element or indirectly coupled with another element with a centered element at the same time.

Unless otherwise defined, all technical and scientific terms used herein have the same meaning as commonly understood by one skilled in the art. The terms used in a specification of the present application herein are only for describing specific embodiments, and are not intended to limit the present application. The terms "and/or" used herein includes any and all combinations of one or more of associated listed items.

Figure 1:
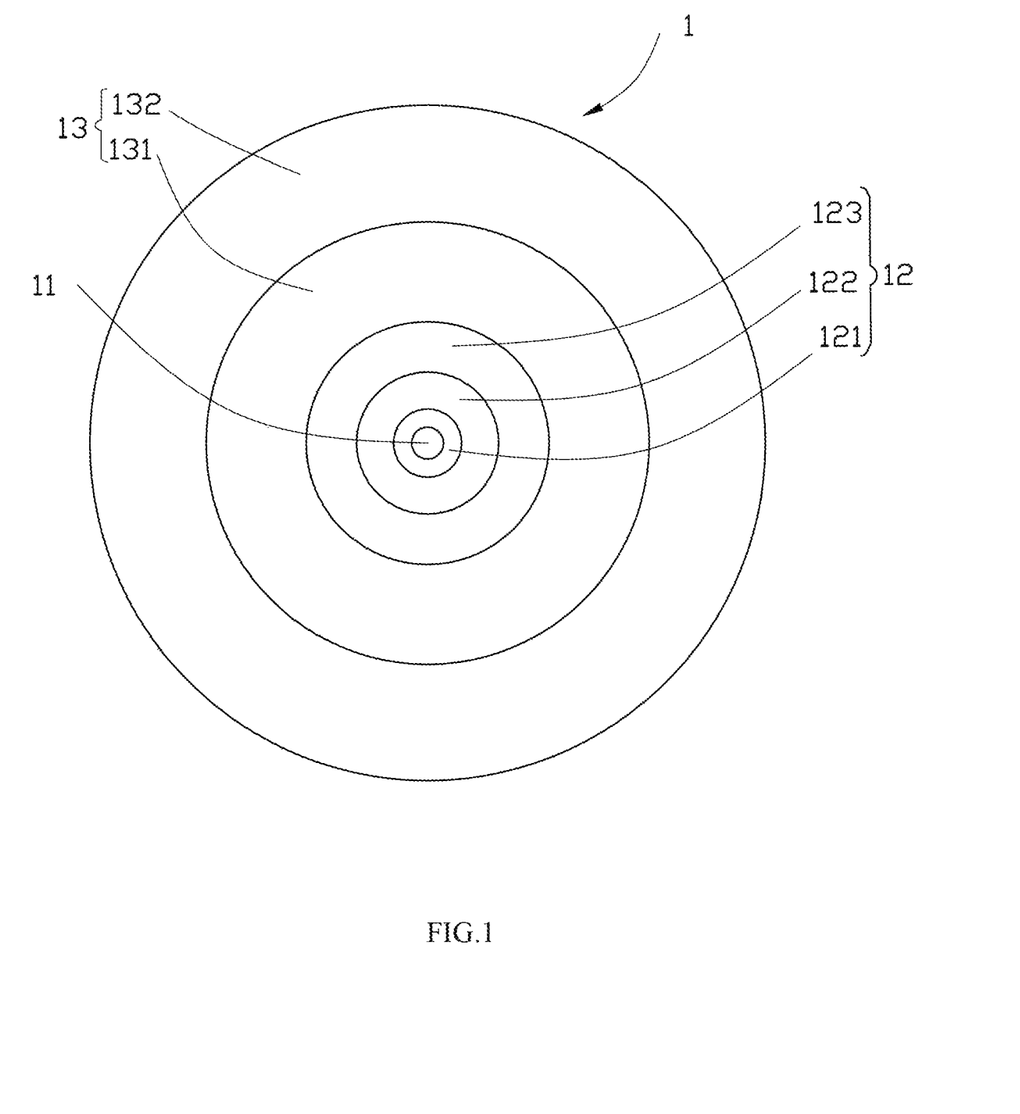
FIG. 1 is a schematic diagram illustrating an embodiment of the optical fiber of the present application.

FIG 1 shows an embodiment of the optical fiber of the present application. The present application provides an optical fiber 1 which comprises, from a center to a periphery, a fiber core 11, a cladding layer 12, and a coating 13. The fiber core 11 is an undoped silica glass, and the radius r1 of the fiber core 11 is 5 µm to 7 µm. Ellipticity of the fiber core 11 is less than 1.5%. Ellipticity of the cladding layer 12 is less than 0.4%. The cladding layer 12 around the fiber core 11 comprises an inner cladding layer 121, an intermediate cladding layer 122, and an outer cladding layer 123. The inner cladding layer 121 is doped with fluorine, and has a thickness r2 of 5 µm to 12 µm. A relative refractive index difference between the inner cladding, layer 121 and the fiber core 11 is −0.4% to −0.2%. The intermediate cladding layer 122 has a thickness r3 of 12 µm to 25 µm. The outer cladding layer 123 is an undoped quartz glass, with a thickness r4 of 25 µm to 45 µm. The coating 13 is made of polyacrylate, and comprises an inner coating 131 and an outer coating 132. The inner coating 131 has a thickness r5 of 25 µm to 40 µm. Ellipticity of the inner coating 131 is less than 0.6%. The outer coating 132 has a thickness r6 of 25 µm to 35 µm. Ellipticity of the outer coating 132 is less than 2%.

The characteristics of the optical fiber 1 are as follows:

The attenuation coefficient of the optical fiber 1 at an optical signal wavelength of 1550 nm is less than 0.165 db/km.

The attenuation coefficient of the optical fiber 1 at an optical signal wavelength of 1625 nm is less than 0.19 db/km.

The attenuation of discontinuous points of the optical fiber 1 at an optical signal wavelength of 1550 nm is less than 0.05 dB.

The mode field diameter of the optical fiber 1 at an optical signal wavelength of 1550 nm is from 11.9 to 13.9 µm, and the mode field area of the optical fiber 1 at an optical signal wavelength of 1550 nm is larger than 110 µm².

The dispersion slope of the optical fiber 1 at an optical signal wavelength of 1550 nm is less than 0.07 ps/nm²*km or less, and a dispersion coefficient of the optical fiber 1 at an optical signal wavelength of 1550 nm is less than 22ps/nm*Km.

The fatigue resistance of the optical fiber 1 is more than 25 when the temperature is between 20 centigrade and 28 centigrade, and the relative humidity is between 40% and 60%.

Figure 2:
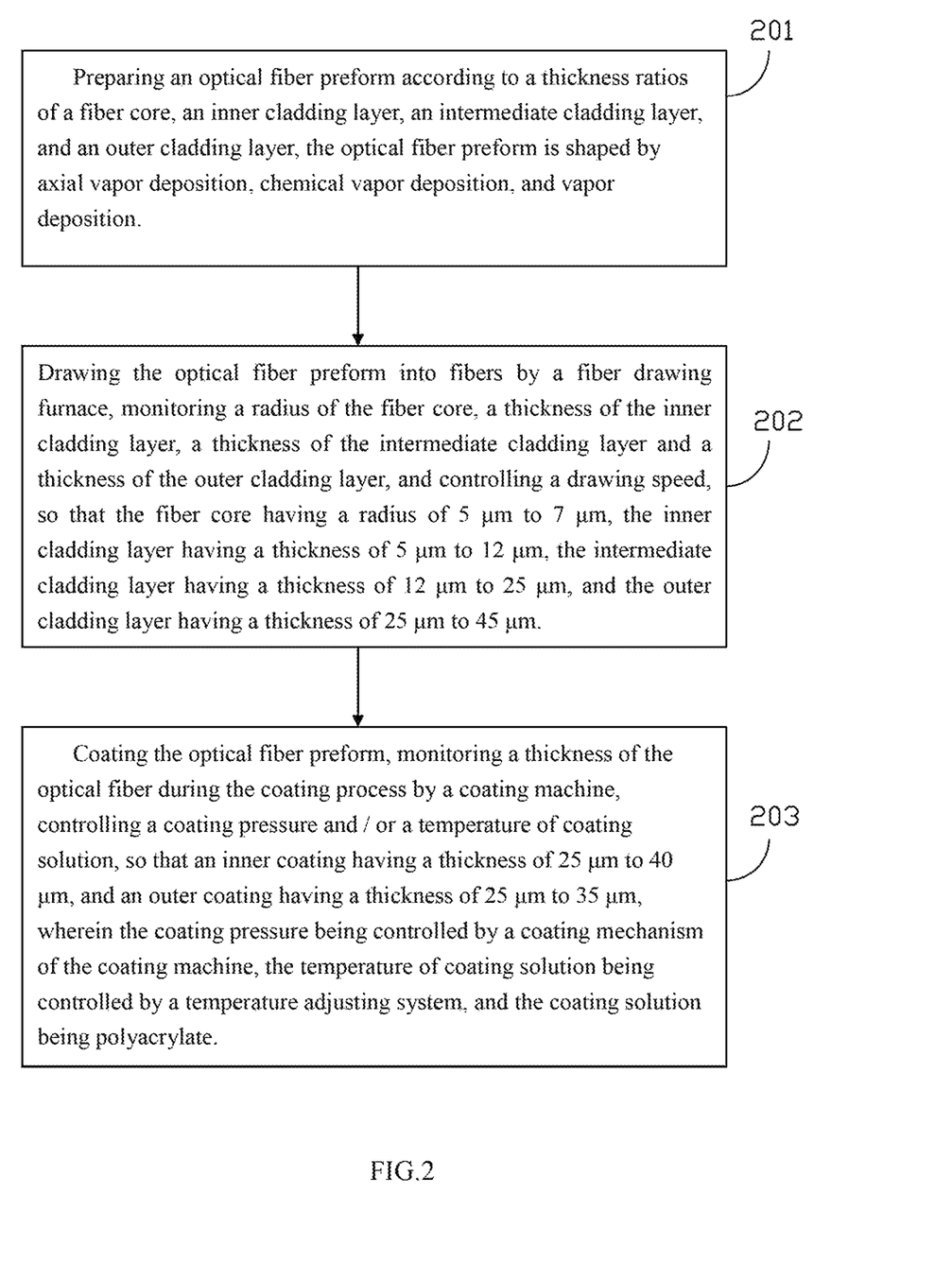
FIG. 2 is a flow chart illustrating an embodiment of preparation processes of optical fibers of the present application.
Figure 3:
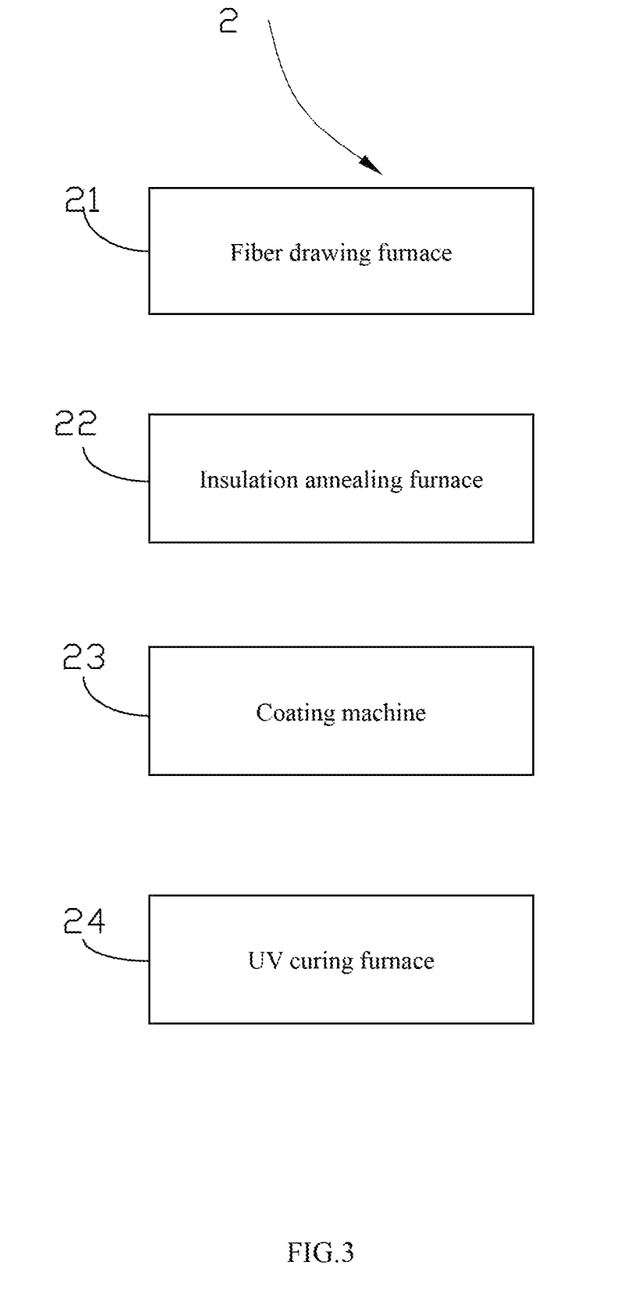
FIG. 3 is a schematic diagram illustrating an embodiment of preparation system of optical fibers of the present application.

Referring to FIG. 2, a flow chart of a fiber preparation process is disclosed. Specifically, the process can manufacture the optical fiber shown in FIG. 1 through an optical fiber preparation system 2 disclosed in FIG. 3. Referring to FIG. 3, the optical fiber preparation system 2 includes a fiber drawing furnace 21, an insulation annealing furnace 22, a coating machine 23, and a UV curing furnace 24.

Figure 4:
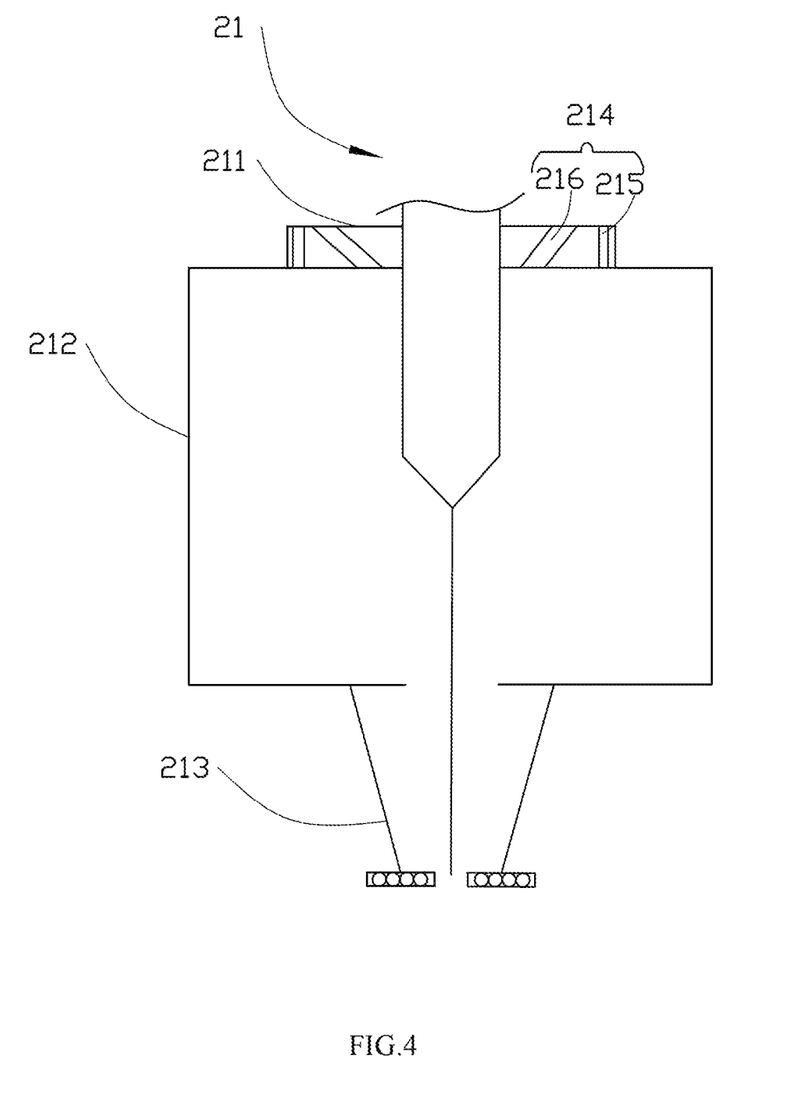
FIG. 4 is a schematic diagram illustrating an embodiment of the fiber drawing furnace of the present application.

Referring to FIG. 4, an embodiment of the fiber drawing furnace 21 is disclosed. The fiber drawing furnace 21 is adapted for drawing a fiber preform into an optical fiber 1. From a top end to a bottom end, the fiber drawing furnace 21 comprises a coaxial top gas disc 211, a fiber drawing furnace body 212, and an annealing pipe 213. The top gas disc 211 is a vertical annular structure, and the top gas disc 211 is provided with many ring-set air inlets 214. The air inlets 214 may be air inlets 215 with vertical downward air flow or may be air inlets 216 with an inclined direction of air flow. The fiber drawing furnace body 212 is a cylinder, and the fiber drawing furnace body 212 is a hollow structure adapted for accommodating the preform. The annealing pipe 213 is located at a bottom end of the furnace body 212 of the fiber drawing furnace. The annealing pipe 213 is funnel-shaped and comprises a plurality of holes configured for exhausting.

Figure 5:
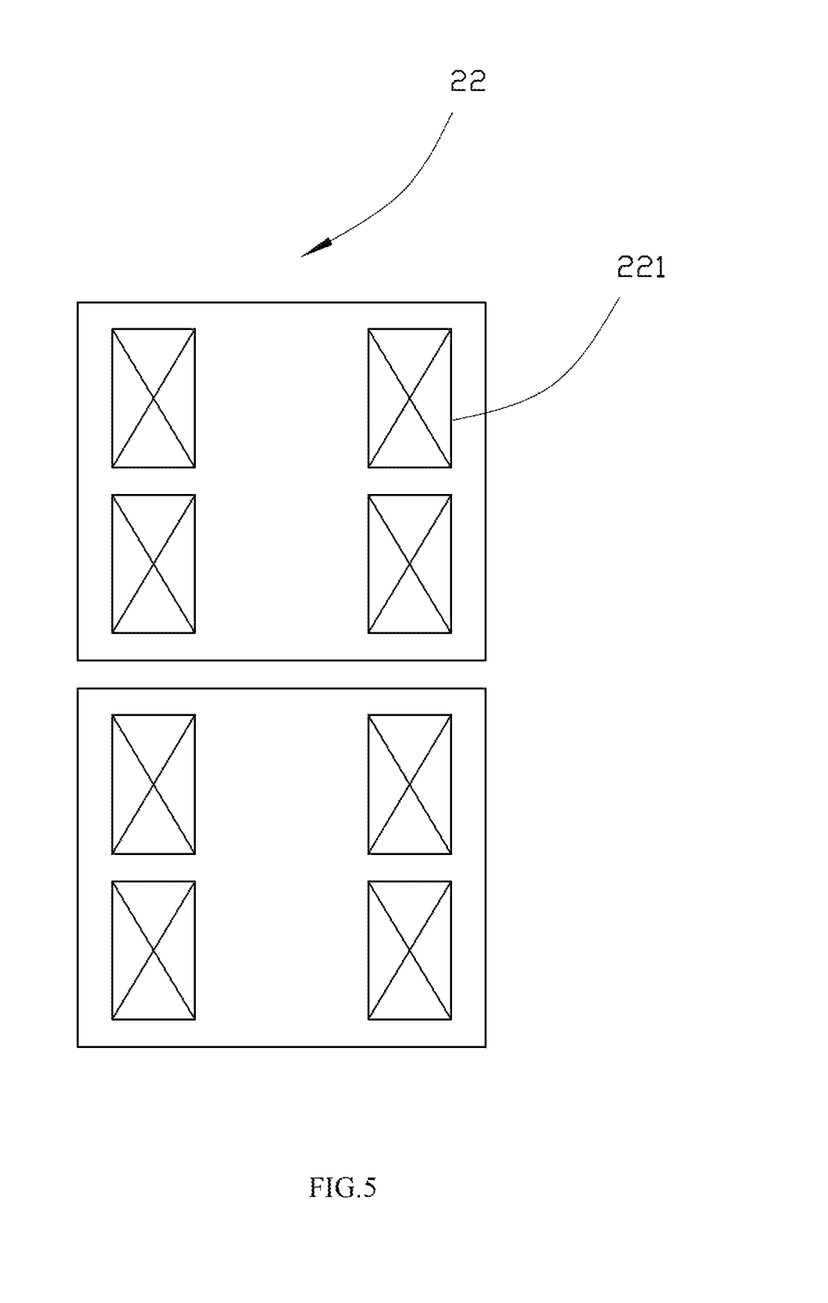
FIG. 5 is a schematic diagram illustrating an embodiment of an insulation annealing furnace of the present application.

Referring to FIG. 5, an embodiment of an insulation annealing furnace 22 is shown. In this embodiment, the number of insulation annealing furnaces 22 is two. These annealing furnaces 22 are arranged coaxially above and below. Each of the furnace 22 comprises, two heating elements 221 which are independent form each other. Each of the heating elements 221 is, controlled by independent power supply control lines, and is electrically connected to a control unit through the power supply control lines independently. Thus, the temperature of each of the insulation annealing furnaces 22 can be adjusted individually and a temperature field of a trapezoidal distribution in each of the insulation annealing furnaces 22 can be formed.

Figure 6:
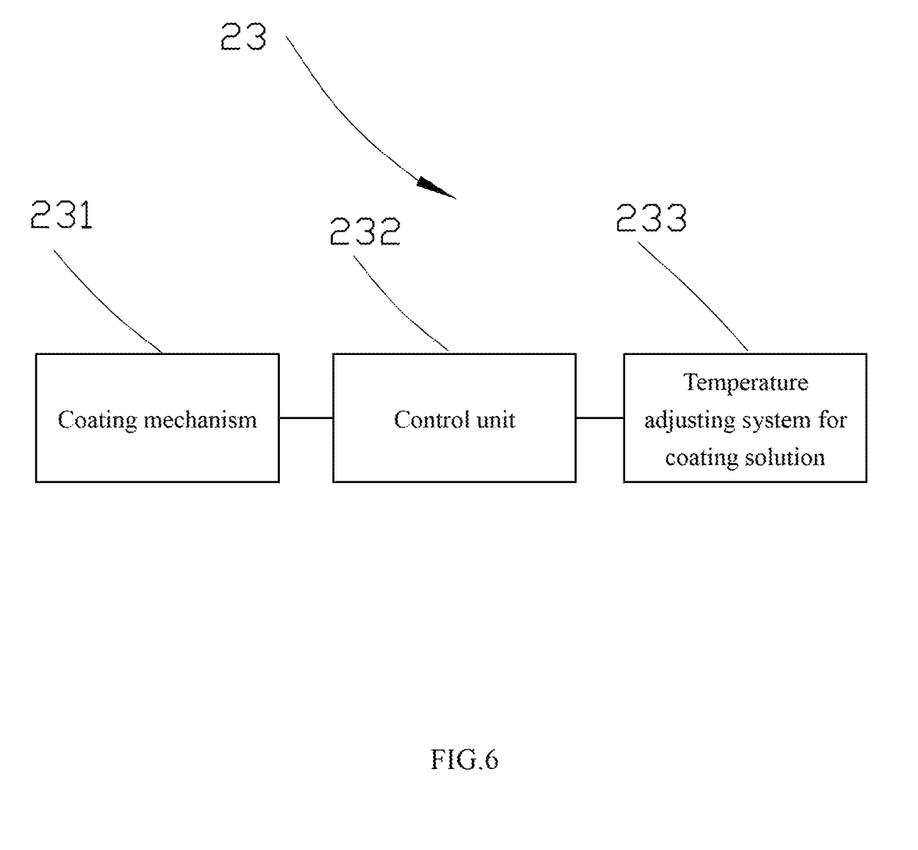
FIG. 6 is a block diagram illustrating an embodiment of a coating machine of the present application.

Referring to FIG. 6, an embodiment of the coating machine 23 is shown. The coating machine 23 includes a coating mechanism 231, a temperature adjusting system for coating solution 233, and a control unit 232. The coating mechanism 231 and the temperature adjusting system 233 are electrically connected to the control unit 232. The coating mechanism 231 applies a coating solution to the optical fiber 1. The coating mechanism 231 can be controlled by the control unit 232 to adjust a coating pressure. The temperature adjusting system 233 controlled by the control unit 232, adjusts a temperature of the coating solution.

Figure 7:
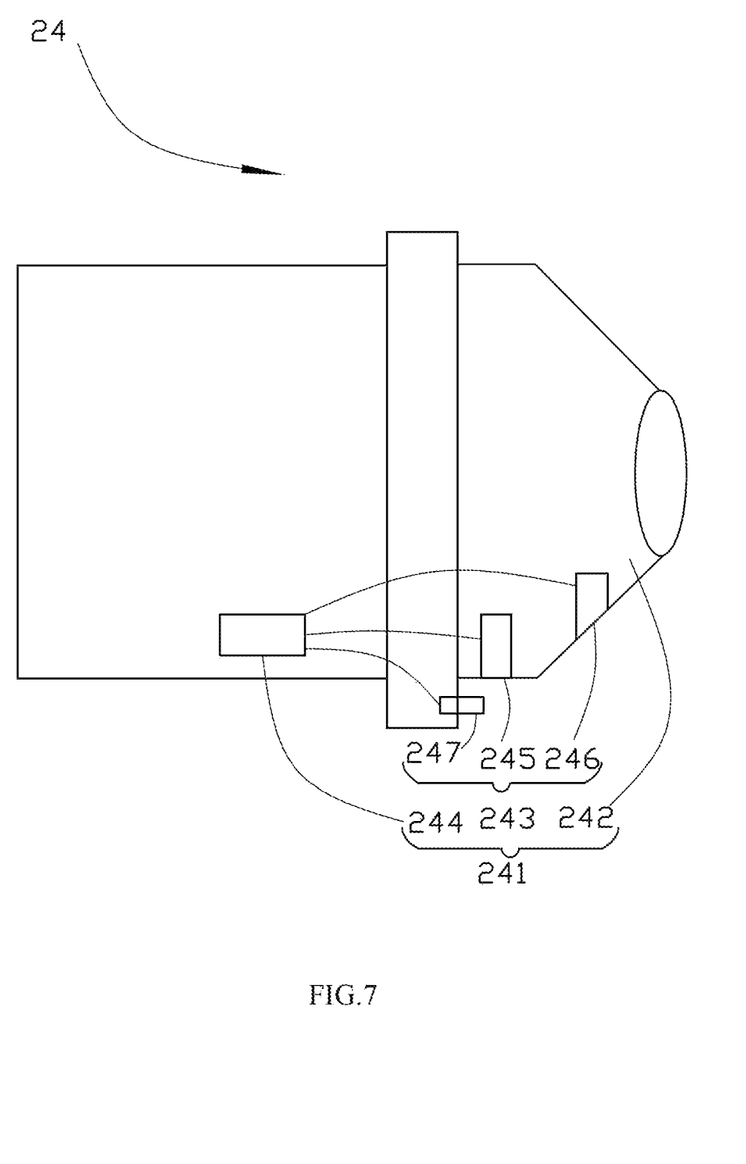
FIG. 7 shows a schematic diagram illustrating an embodiment of an UV curing furnace of the present application.

Referring to FIG. 7, an embodiment of a UV curing furnace 24 is disclosed. The UV curing furnace 24 includes an exhaust system 241. The exhaust system 241 includes exhaust pipes 242, a detecting device 243, and a control unit 244. The detecting device 243 includes a temperature detector 245 installed in the body of the UV curing oven 24, a wind speed detector 246 installed in the exhaust pipe 242 of the curing furnace, and valves 247. The control unit 244 can adjust the valve 247 according to data from the temperature detector 245 and the wind speed detector 246, and change operations of the exhaust.

With reference to FIG. 2, the optical fiber preparation processes include:

Block S201 (preform preparation): the preform is prepared by an axial vapor deposition process, a modified chemical vapor deposition process, and an out-of-pipe vapor deposition process according to the thickness ratio of the fiber core 11 and each cladding layer 12. Specifically, block S201 includes:

The undoped silica core rod for the fiber preform is created by an axial vapor deposition process to achieve rapid deposition, thereby reducing the attenuation of the optical fiber 1. A modified chemical vapor deposition process is used to achieve a depressed structure of refractive index of the cladding 12, and the relative refractive index difference between the inner cladding 121 and the fiber core 11 is −0.4% to −0.2%. Fluorine doping is applied. The outer vapor deposition process is used to deposit an outer cladding layer 123 of undoped quartz glass, which has a high deposition rate and effectively reduces the production cost.

Block S202 (melting and annealing processes): the preform is drawn into a fiber from a fiber drawing furnace 21. Overall thicknesses of the fiber core 11, the inner cladding layer 121, the intermediate cladding layer 122, and the outer cladding layer 123 are monitored during the processes. The drawing speed is controlled such that the radius r1 of the fiber core 11 is 5 μm to −7 μm, the thickness r2 of the inner cladding layer 121 is 5 μm to −12 μm, the thickness r3 of the intermediate cladding layer 122 is 12 μm to −25 μm, and the thickness r4 of the outer cladding layer 123 is 25 μm to 45 μm. In one embodiment, in the drawing process, overall thickness of the fiber core 11 and the cladding layers 12 is 100 μm, the drawing speed can be increased thereby reducing the thicknesses of the fiber core 11 and each of the cladding layers 12. In other embodiment, overall thickness of the fiber core 11 and the cladding layers 12 is 40 μm, the drawing speed can be reduced thereby increasing the radius of the fiber core 11 and the thickness of each of the cladding layers 12, such that the radius of the fiber core 11, the thickness of the inner cladding layer 121 and the intermediate cladding layer 122, and the thickness of the outer cladding layer 123 are within predetermined ranges. Specifically, block S202 includes:

The preform is inserted from a top gas disc 211 of the fiber drawing furnace 21 into the body of the fiber drawing furnace 212, so that the preform can be plastically drawn into a fiber in the body of the fiber drawing furnace 212. Wherein the temperature inside the body of the fiber drawing furnace 212 is 2000 centigrade to 2200 centigrade, and the mode field diameter of the fiber can be controlled by adjusting the temperature of the fiber drawing furnace 21. Specifically, the mode field diameter of the optical fiber and the mode field area of the optical fiber are increased by raising the temperature inside the body of the fiber drawing furnace 212. Conversely, the mode field diameter of the optical fiber 1 and the mode field area of the optical fiber 1 are reduced by lowering the temperature inside the body of the fiber drawing furnace 212. The traction speed of the preform is ≥2000 m/min. An inert gas is introduced into the fiber drawing furnace 21 through air inlets 214 on the top gas disc 211, wherein an air inlet 216 with inclined downward air flow direction makes an angle between the air supply direction and the vertical direction of 15 degree to 45 degree. Inclined downward air flow from the air inlet 216 reduces the probability of contact between ash and optical fiber 1. An air inlet 215 with vertical downward air flow direction is used to purge the inner wall of the fiber drawing furnace 21, which prevents ash from being deposited on the inner wall of the fiber drawing furnace body 212. Ash deposited on the inner wall of the fiber drawing furnace 21 may adversely affect the strength of the optical fiber 1 under high temperature diffusions. The fiber is passed through the annealing pipe 213 comprising a plurality of holes for exhausting thereby preventing the ash from depositing. Ash discharged from the annealing pipe 213 is collected by hoses connected to the ash recovery device, a temperature of the outlet of the annealing pipe 213 being 1600 centigrade to 1800 centigrade.

Block S202 further comprises the fiber being inserted into two coaxial insulation annealing furnaces 22, wherein each of the insulation annealing furnaces 22 forms a gradient temperature field between 800 centigrade and 1200 centigrade. The actual temperature of the optical fiber exiting the insulation annealing furnaces 22 is controlled, which ensures a temperature above 1000 centigrade is maintained, fully releasing internal stresses of the optical fiber. At the same time, a cooling rate of fibers is below 5000 centigrade/s, the internal stresses of the fiber may be completely released, eliminating the likelihood of Rayleigh scattering caused by density unevenness. Attenuation coefficient of the fiber thus remains low.

In addition, the actual temperature of the fiber exiting the annealing furnace 22 should not be too high, such as above 1200 centigrade. If the cladding layer 12 of the fibers is subjected to a sudden change in temperature and the fiber core 11 remains at a high temperature, internal stresses may be introduced in the cladding layer 12 and the fiber core 11. Such internal stresses can give rise to Rayleigh scattering which causes an increase in signal attenuation. Furthermore, cost of fibers may be increased due to excessive energy consumption and excessive use of helium for cooling fibers exiting the annealing furnace 22. In addition, the insulation annealing furnaces 22 and the control unit 232 are electrically connected thereby the temperature of the insulation annealing furnaces 22 can be remotely controlled. A constant temperature for the insulation and the annealing can be realized by the control unit 232.

Block S203 (process for coating and curing): the fiber is coated in a coating machine 23. During, the coating process, an overall thickness of the fiber 1 is detected. The coating pressure is controlled and the temperature of coating solution may also be controlled by a temperature adjusting system 233. The inner coating 131 thus has a thickness r5 of 25 μm to −40 μm, and the outer coating 132 has a thickness r6 of 25 μm to −35 μm, wherein the coating solution is made of polyacrylate.

In one embodiment, during the coating process, when the thickness of the optical fiber 1 is 175 μm; the coating pressure may be decreased, or the coating solution temperature may be lowered, thereby lowering the thickness of the inner coating layer 131 and the outer layer 132. When the thickness of the optical fiber 1 is 90 μm, the coating pressure may be increased, or the coating solution temperature may be increased, thereby increasing the thicknesses of the inner coating 131 and the outer coating 132 such that the thicknesses of the inner and outer coatings 13 are within predetermined ranges.

Block S203 further includes:

The optical fiber 1 being brought into the UV curing furnace 24, wherein the power of the UV curing furnace 24 is controlled to be 70% to 95% of its rated power. The cured volatiles of the coating 13 and the harmful gases are extracted by the exhaust system 241 of the UV curing furnace 24. Wherein the temperature in the UV curing furnace 24 is detected by the temperature detector 245 and the temperature is fed back to the control unit 244 of the UV curing furnace 24. Wind speeds in the exhaust system 241 are detected by the wind speed detector 246 in the exhaust pipe 242 of the UV curing furnace 24, and the wind speeds are fed back to the control unit 244. One of the control unit 232 according to the temperature and the control unit 244 according to the rind speed can adjust the valve 247 of the UV curing furnace 24 to regulate the exhaust efficiency.

If the temperature and the wind speed are within preset ranges, the optical fiber 1 is produced normally. If the temperature is too high and/or the wind speed is too low, the control unit (232,244) opens the valve 247 more and increases the amount of exhaust air. If the temperature is too low and/or the wind speed rate is too high, the control unit (232,244) closes the valve 247 and reduces the amount of exhaust air. If the temperature and the wind speed do not adjust accordingly within a predetermined time, the exhaust system 241 is declared malfunctioning. In this embodiment, the temperature and the wind speed range values are stored in the control unit (232,244).

The conditions for exhausting the UV curing furnace 24 can be monitored remotely during the fiber coating curing processes, and the curing can be assessed by remotely monitoring of the UV curing condition. At the same time, the exhaust can be automatically adjusted by monitoring the curing quality of the optical fiber 1. In addition, the quality of the optical fiber 1 may be improved by removing, harmful gases in the UV curing furnace 24.

In this embodiment, the optical fibers 1 undergo a screening process and a fiber take-up process to complete the processing. The screening process and the fiber take-up process are not within the scope of the present disclosure and are not described in detail herein.

The optical fiber, the optical fiber preparation process, and optical fiber preparation system have following characters.

First, design of the cladding layer doped with fluorine, combined with the fiber core and each cladding layer, gives the optical fiber a larger effective area. In the process of fiber drawing, the roundness of the optical fiber is better. The surface of the fiber core basically has no impurities or cuts, and the strength and fatigue resistance are good for harsh environments and be used at least for 25 years.

Second, the adhesion of ashes to the wall of the fiber drawing furnace can be inhibited through the vertical downward air inlet. The adhesion of ashes to the surface of the fiber core is inhibited through the inclined downward air inlet. Cracks and stress concentration are canceled or reduced in the cooling process.

Third, the attenuation coefficient of the optical fiber can be reduced by means of an insulation annealing furnace.

Fourth, the UV curing furnace can monitor the exhaust function (on-line monitoring if necessary) and automatically adjust the exhaust function.

The embodiments shown and described above are only examples. Many details are often found in such art, therefore many such details are neither shown nor described. Even though numerous characteristics and advantages of the present technology have been set forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims. It will therefore be appreciated that the embodiments described above can be modified within the scope of the claims.

What is claimed is:

1. An optical fiber comprises, from a center to a periphery of the optical fiber, a fiber core; a cladding layer; and a coating, wherein the fiber core is an undoped silica glass, with a radius of 5 µm to 7 µm, ellipticity of the fiber core being less than 1.5%, the cladding layer comprises an inner cladding layer, an intermediate cladding layer, and an outer cladding layer, the inner cladding layer being doped with fluorine, having, a thickness of 5 µm to 12 µm, a relative refractive index difference between the inner cladding layer and the fiber core being −0.4% to −0.2%, the intermediate cladding layer having a thickness of 12 µm to 25 µm, the outer cladding layer being a pure quartz glass layer with a thickness of 25 µm to 45 µm, and an overall ellipticity of the cladding layer being less than 0.4%, and the coating is made of polyacrylate, and comprises an inner coating and an outer coating the inner coating having, a thickness of 25 µm to 40 µm, and the outer coating having a thickness of 25 µm to 35 µm, and an ellipticity of the outer coating being less than 2%.

2. The optical fiber of claim 1, wherein the optical fiber has an attenuation coefficient of 0.165 db/km or less at an optical signal wavelength of 1550 nm, and an attenuation coefficient of 0.19 db/km or less at an optical signal wavelength of 1625 nm.

3. The optical fiber of claim 1, wherein the attenuation of discontinuous points of the optical fiber is 0.05 dB or less than 0.05 dB at an optical signal wavelength of 1550 nm.

4. The optical fiber of claim 1, wherein the optical fiber under an optical signal wavelength of 1550 nm has a mode field diameter of 11.9 µm to 13.9 µm, and a mode field area of 110 µm$^2$ or larger.

5. The optical fiber of claim 1, wherein the optical fiber at an optical signal wavelength of 1550 nm has a dispersion slope of 0.07 ps/nm$^2$*km or less, and a dispersion coefficient of 22 ps/mn*Km or less.

6. The optical fiber of claim 1, where the optical fiber has an anti-fatigue parameter of more than 25, under the temperature of 20 to 28 centigrade and the relative humidity of 40 to 60%.

7. A method for manufacturing the optical fiber comprising preparing an optical fiber preform; melting and annealing process the optical fiber preform; and coating and curing the optical fiber preform, wherein the optical fiber preform comprises a fiber core rod, an inner cladding precursor, an intermediate cladding precursor and an outer cladding precursor, and preparing the optical fiber preform comprises:

shaping the fiber core rod by axial vapor deposition, the fiber core rod comprising undoped silica, doping the inner cladding precursor with fluorine, and preparing the inner cladding precursor by chemical vapor deposition, and forming an inner cladding layer with the fluorine-doped cladding precursor, adjusting a doping content of fluorine to control a relative refractive index difference between the inner cladding layer and the fiber core, making the outer cladding precursor of undoped silica by vapor deposition, preparing the optical fiber preform according to a thickness ratios of the fiber core, the inner cladding layer, the intermediate cladding layer, and the outer cladding layer, the melting and annealing processes comprises:

drawing the optical fiber preform into fibers by a fiber drawing furnace, monitoring a radius of the fiber core, a thickness of the inner cladding layer, a thickness of the intermediate cladding layer and a thickness of the outer cladding layer, and controlling a drawing speed, so that the fiber core having a radius of 5 μm to 7 μm, the inner cladding layer having a thickness of 5 μm to 12 μm, the intermediate cladding layer having a thickness of 12 μm to 25 μm, and the outer cladding layer having a thickness of 25 μm to 45 μm, the coating and curing processes comprises:

coating the optical fiber preform, monitoring a thickness of the optical fiber during the coating process by a coating machine, controlling a coating pressure and/or a temperature of coating solution, so that an inner coating having a thickness of 25 μm to 40 μm, and an outer coating having a thickness of 25 μm to 35 μm, wherein the coating pressure being controlled by a coating mechanism of the coating machine, the temperature of coating solution being controlled by a temperature adjusting system, and the coating solution being polyacrylate.

8. A process of claim 7, the melting and annealing processes further comprises:

inserting the optical fiber preform into a fiber drawing furnace body from a top end of the fiber drawing furnace:

melting and drawing the optical fiber preform to form the optical fibers in the fiber drawing furnace body, wherein the temperature in the fiber drawing furnace body is between 2000 centigrade and 2200 centigrade, and the optical fiber preform is drawn with a traction speed equal to or faster than 2000 m/min;

supplying an inert gas into the fiber drawing furnace through air inlets on the top end of the fiber drawing furnace, wherein the air inlets comprises air inlets with an inclined direction and air inlets with vertically downward air flow, the air inlets with an inclined direction having an angle between an air supply direction and a vertical direction of 15 degree to 45 degree, the air inlets with vertically downward air flow configured to purge an inner wall of the fiber drawing furnace; and passing the optical fibers through an annealing pipe with a plurality of holes configured for exhausting ashes, and collecting the ashes from the annealing pipe to an ash recovery device by a hose, wherein a temperature of an outlet of the annealing pipe is between 1600 centigrade and 1800 centigrade.

9. A process of claim 7, wherein the melting and annealing processes further comprises inserting the optical fibers into two coaxial insulation annealing furnaces, wherein each of the two coaxial insulation annealing, furnaces forms a gradient temperature field of 800 centigrade to 1200 centigrade.

10. A process of claim 7, wherein the coating and curing processes further comprises:

inserting the optical fibers into a UV curing furnace, wherein a power of the UV curing furnace is controlled at 70% to 95% of a rated power of the UV curing furnace;

extracting cured volatiles of the coating and gases through an exhaust system of the UV curing furnace, wherein an internal temperature of the UV curing furnace is detected by a temperature detector, the internal temperature of the UV curing furnace is fed back to a control unit of the UV curing furnace, and a wind speed in the exhaust system is detected by a wind speed detector in an exhaust pipe of the UV curing furnace, the wind speed is fed back to the control unit; and adjusting openness of a valve of the UV curing furnace by the control unit to regulate an exhaust efficiency, according to data of the internal temperature of the UV curing, furnace and the wind speed.

11. A system for manufacturing optical fibers comprising a fiber thawing furnace; and a coating machine; wherein the optical fiber is drawn form a fiber preform comprising a fiber core rod, an inner cladding precursor, an intermediate cladding precursor and an outer cladding precursor, the preform being prepared by chemical vapor deposition, the fiber drawing furnace comprises a coaxial top gas disc; a fiber drawing furnace body; and an annealing pipe, wherein the coaxial top gas disc is a vertical annular structure and comprises a plurality of ring-set air inlets comprising air inlets with vertical downward air flow and air inlets with an inclined direction of air flow, the drawing furnace body is cylindrical and hollow for holding the fiber preform, the annealing pipe is funnel-shaped with porous structure for exhausting, each of the optical fibers is made by the fiber drawing furnace and has a fiber core of 5 μm to 7 μm radius, an inner cladding layer of 5 μm to 12 μm thickness, an intermediate cladding layer of 12 μm to 25 μm thickness and an outer cladding layer of 25 μm to 45 μm thickness by controlling of a drawing speed and an internal temperature of the fiber drawing furnace and a temperature of the outlet of the annealing pipe:

the coating machine comprises a coating mechanism; a temperature adjusting system for coating solution; and a control unit, wherein each of the coating mechanism and the temperature adjusting system is electrically connected with the control unit, the coating mechanism being adapted to coat a coating solution on a surface of the optical fibers, and adjust a coating pressure by the control unit, the temperature adjusting system being adapted to regulate a temperature of the coating solution by the control unit, the optical fibers being coated by the coating machine to form an inner coating of 25 μm to 40 μm thickness and an outer coating of 25 μm to 35 μm thickness under the control of the coating pressure and the temperature of the coating solution.

12. A system in claim 11, the system for manufacturing optical fibers further comprises two coaxial annealing insulation furnaces, each of the two coaxial annealing insulation furnaces comprising two heating elements which are independent to each other.

13. A system in claim 11, the system for manufacturing optical fibers further comprises a UV curing furnace, the UV curing furnace comprising an exhaust system comprising exhaust pipes; a detecting device; and a control unit, wherein the detecting device comprises a temperature detector installed in a body of the UV curing furnace; and a wind speed detector installed in the exhaust pipe, the control unit and the detecting device are electrically connected, and a valve of the UV curing furnace is adjustable according to data from the temperature detector and the wind speed detector.

* * * * *